United States Patent
Duarte et al.

(10) Patent No.: US 11,725,728 B2
(45) Date of Patent: Aug. 15, 2023

(54) INTERMEDIATE GEARSHIFT ARM

(71) Applicant: Renault s.a.s., Boulogne-Billancourt (FR)

(72) Inventors: Frederic Duarte, Guyancourt (FR); Didier Terrasse, Montesson (FR)

(73) Assignee: Renault s.a.s., Boulogne-Billancourt (FR)

(*) Notice: Subject to any disclaimer, the term of this patent is extended or adjusted under 35 U.S.C. 154(b) by 15 days.

(21) Appl. No.: 17/600,449

(22) PCT Filed: Mar. 31, 2020

(86) PCT No.: PCT/EP2020/059171
§ 371 (c)(1),
(2) Date: Sep. 30, 2021

(87) PCT Pub. No.: WO2020/201308
PCT Pub. Date: Oct. 8, 2020

(65) Prior Publication Data
US 2022/0196150 A1 Jun. 23, 2022

(30) Foreign Application Priority Data
Apr. 4, 2019 (FR) ..................... 19 03625

(51) Int. Cl.
*F16H 63/00* (2006.01)
*F16H 63/30* (2006.01)
*F16H 63/32* (2006.01)

(52) U.S. Cl.
CPC ......... *F16H 63/3013* (2013.01); *F16H 63/32* (2013.01); *F16H 2063/3079* (2013.01)

(58) Field of Classification Search
CPC ................ F16H 63/3013; F16H 63/32; F16H 2063/3079; F16H 63/30; F16H 57/021; F16H 57/023
See application file for complete search history.

(56) References Cited

U.S. PATENT DOCUMENTS

| 5,146,806 | A | | 9/1992 | Doster et al. |
| 5,385,223 | A | * | 1/1995 | Certeza ................... F16H 63/22 192/53.1 |

FOREIGN PATENT DOCUMENTS

| CN | 105333136 B | 12/2017 |
| DE | 0 412 279 A2 | 2/1991 |
| DE | 10 2012 022 543 A1 | 5/2014 |
| JP | 62-52355 U | 4/1987 |

OTHER PUBLICATIONS

International Search Report dated Jul. 8, 2020 in PCT/EP2020/059171 filed Mar. 31, 2020, 2 pages

* cited by examiner

*Primary Examiner* — Victor L MacArthur
(74) *Attorney, Agent, or Firm* — Oblon, McClelland, Maier & Neustadt, L.L.P.

(57) ABSTRACT

A device for the internal actuation of a gearbox includes a main axle mounted such that it can slide through a housing, and has a transverse extension capable of acting on an intermediate arm which is designed to conduct a gearshift fork. The intermediate longitudinal member is mounted translationally with respect to the housing.

11 Claims, 3 Drawing Sheets

INTERMEDIATE GEARSHIFT ARM

PRIOR ART

Actuating devices that enable gears to be selected and changed using actuators inside a gearbox are known. Such devices usually have a fork used to change gears that is moved in translation by a selector finger via an elongate interface part. For architectural reasons, the fork is sometimes moved away from the selector finger. Since the risk of deformation of the interface part increases with the length thereof, it is known to mitigate this risk using a supporting element fastened to the casing of the gearbox that absorbs the forces applied to the interface part via a pivot link between the supporting element and the interface part.

However, this solution generates imprecision in the positioning of the fork and inverts the direction of movement of the fork in relation to the selector finger, which is undesirable in semi-automatic gearboxes.

DESCRIPTION OF THE INVENTION

The invention is intended to overcome at least some of the aforementioned drawbacks and to propose a smaller actuating device with enhanced precision and reliability.

The invention therefore relates to an internal gearbox actuating device comprising a main shaft mounted slidingly through a casing and including a transverse extension designed to act on an intermediate arm that is used to move a gearshift fork, in which the intermediate longitudinal member is mounted in translation in relation to the casing.

In one embodiment, the gearshift fork is positioned on a secondary shaft.

According to one embodiment, the intermediate longitudinal member is mounted on a tertiary shaft.

Preferably, the tertiary shaft is mounted slidingly through the casing and the intermediate longitudinal member is fastened to the tertiary shaft.

The transverse extension of the main shaft can also be designed to cooperate with a slot in the intermediate arm.

Advantageously, the intermediate longitudinal member has a slot that is designed to cooperate with a projection from the gearshift fork.

For example, the projection from the fork has a rectangular section.

Preferably, at least one of the primary, secondary and tertiary shafts is mounted slidingly in bearings seated in the casing.

Advantageously, a rotation prevention device is provided to limit the angular displacement of the intermediate arm.

In one embodiment, the rotation prevention device includes translational guide means for the intermediate arm.

SHORT DESCRIPTION OF THE DRAWINGS

The invention is further described with reference to the embodiments provided by way of non-limiting examples and illustrated in the attached drawings, in which.

DETAILED DESCRIPTION

Figure 1:
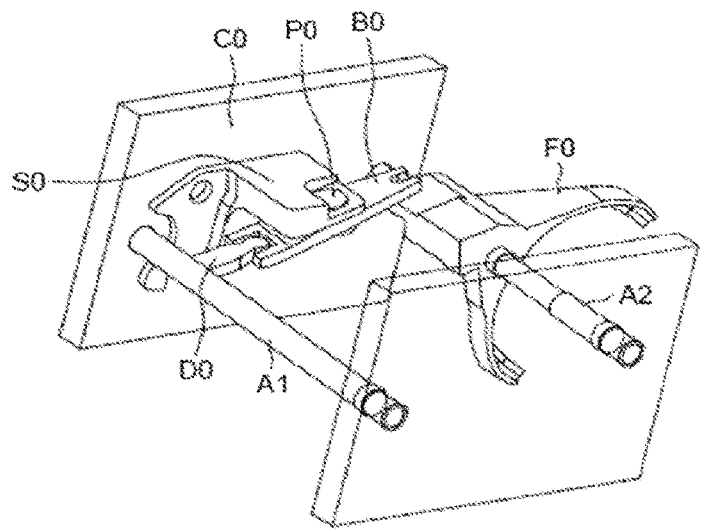
FIG. 1 shows a gearbox actuating device according to the prior art.

FIG. 1 shows an internal gearbox actuating device described in patent application FR3026808A1. The device has several actuation elements to enable gearshifts, notably a main shaft A1 mounted slidingly through a casing C0 and including a transverse extension D0 designed to act on an intermediate arm B0 designed to move a gearshift fork F0, the intermediate arm B0 being mounted rotatably in relation to the casing C0 about a pivot link P0 on a supporting element S0 provided on the casing C0. The pivot P0 is provided to absorb the forces applied to the intermediate arm B0 when the finger D0 rotates the arm B0 to move the fork F0. As shown, the direction of translational movement of the fork F0 is inverted in relation to the direction of translational movement of the finger D0. Furthermore, this device accumulates the positional deviations of the pivot P0 and of the finger D0 in relation to the casing C0, which results in unwanted rotation of the arm B0 about the pivot P0, and therefore imprecise positioning of the fork F0. These problems make it necessary to use stricter manufacturing tolerances for the actuators and particularly precise position sensors.

Figure 2:
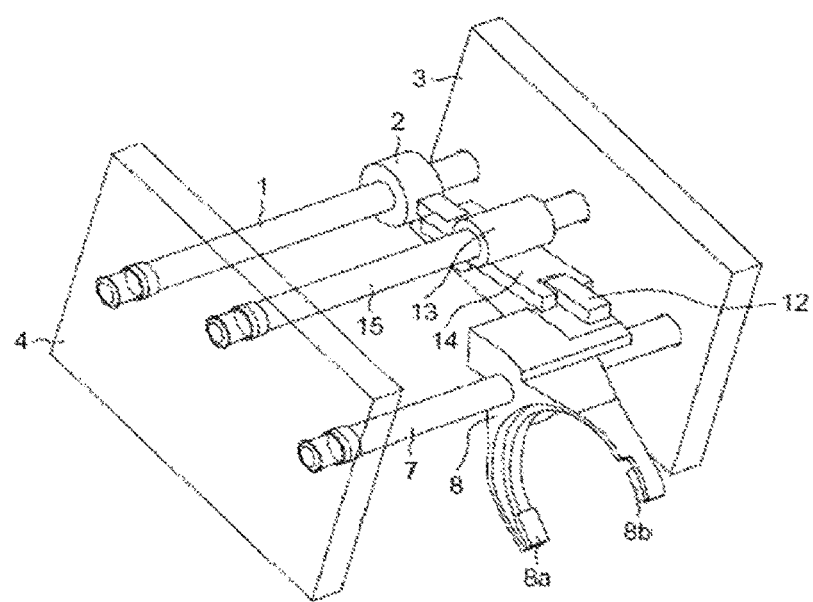
FIG. 2 is a perspective view of an embodiment of the actuating device.
Figure 3:
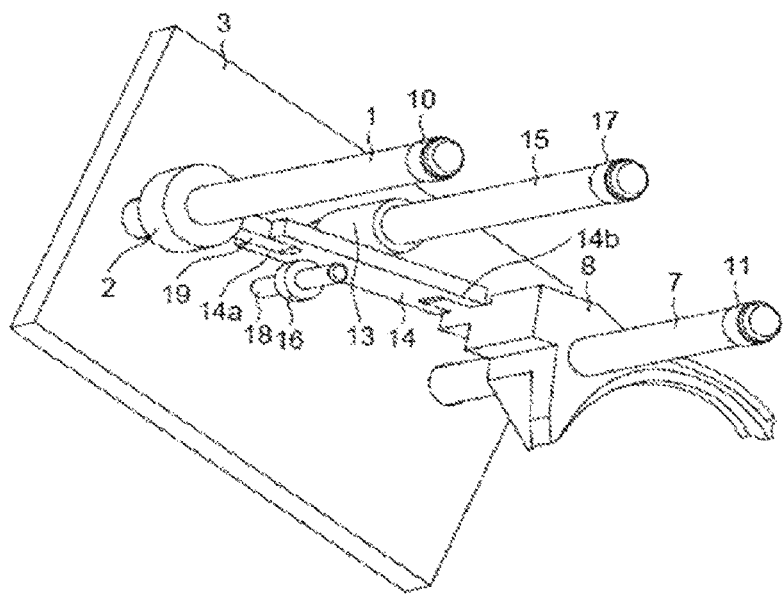
FIG. 3 is another perspective view of the actuating device in FIG. 2.

FIGS. 2 and 3 show an embodiment of the actuating device according to the invention that is provided in a gearbox for the internal control of gearshifts and designed to cooperate with the casing 3, 4 of the gearbox.

"Casing" means the structural parts of the gearbox, notably including one or two members on which the actuating device is assembled. Accordingly, each shaft mounted slidingly through the casing 3, 4 can be mounted through one or more members of the casing 3, 4.

The device comprises a main shaft 1 mounted slidingly through at least one member of the casing 3, 4 and a secondary shaft 7 including a gearshift fork 8.

Unlike in the prior art, an intermediate arm 14 is mounted in translation in relation to the casing 3, 4.

Said arm transmits a translational movement of a transverse extension 1 rigidly connected to the main shaft 1 to the fork 8.

In one embodiment, the fork 8 can be guided in translation by a secondary shaft 7.

The secondary shaft 7 is mounted slidingly through the casing 3, 4 and the fork 8 is linked to the secondary shaft 7 and unable to move in translation.

The longitudinal member 14 can also be guided in translation by a tertiary shaft 15.

The tertiary shaft 15 absorbs the forces, notably sheer forces, applied to the longitudinal member 14 when the longitudinal member 14 transmits the translational movement of the shaft 1 to the fork 7.

The tertiary shaft 15 is mounted slidingly through the casing 3, 4 and the longitudinal member 14 is fastened to the tertiary shaft 15, for example by means of a hub 13 of the arm 14 assembled by hooping or by means of a pin to the shaft 15.

The main, secondary and tertiary shafts are cylindrical extensions at least partially traversing an element of the casing 3, 4. Said shafts are made of a material including aluminum.

The main shaft 1 includes a transverse extension 2 designed to cooperate with a slot 14*a* in the arm 14. The transverse extension 2 is for example a finger 2 of round or square section extending approximately perpendicularly to the main shaft 1.

The longitudinal member 14 can have a slot 14*b* that is designed to cooperate with a projection 12 from the gearshift fork 8. The fork 8 is therefore linked to the arm 14 when the projection 12 is cooperating with the slot 14*b*, or disconnected from the arm 14 in the opposite case.

Other types of parts can nonetheless also be used to prevent the arm 14 from rotating without thereby moving outside the scope of the invention. Notably, the projection 12, the rod 18 and the transverse extension 19 can have a flat or have a rectangular section.

The main, secondary or tertiary shafts 3, 7, 15 are for example mounted slidingly in relation to the casing 3, 4 via bearings 10, 11, 17 that are seated in the casing 3, 4 or fastened to said shafts. The tertiary shaft 15 can be fastened to the casing 3, 4, in which case the longitudinal member 14 is mounted slidingly on the tertiary shaft 15.

The bearings 10, 11, 17 are for example split rings made of a material including the metal with an internal lining made of polytetrafluoroethylene (PTFE).

As shown in FIG. 3, a rotation prevention device is provided to limit an angular displacement of the arm 14 about the tertiary shaft 15. Said device includes translational guide means for the arm 14, such as a rod linked to the casing 3, 4 that passes through a tubular shaft 16 provided on the longitudinal member 14.

The clearances between the shafts and bearings, notably the clearance defined by the diameter of the rod 18 and the tube 16, must be large enough to enable the longitudinal member 14 to slide freely and small enough to limit the angular play thereof.

For a shaft 3, 7, 15, 18 with a diameter of between 10 mm and 18 mm (f7 fit), the manufacturing tolerance is substantially approximately 9 μm.

Each ring 10, 11, 16, 17 can have a seat provided in the casing 3, 4 with a section of between 12 mm and 20 mm (H7 fit). For each seat, the manufacturing tolerance is substantially approximately 15 μm.

The sliding clearance of a shaft 3, 7, 15, 18 in the ring 10, 11, 16, 17 after fitting in the casing 3, 4 is between 6 μm and 128 μm.

Consequently, when changing gear, the force transmitted to the arm 14 rigidly connected to the tertiary shaft is absorbed by the rings 17, which helps to limit the forces on the shaft 15, and therefore the deformation thereof. This actuating device therefore helps to increase the positioning precision of the fork, providing more precise control of gearshifts.

The invention claimed is:

1. An internal gearbox actuating device comprising:
  a main shaft mounted slidingly through a casing and including a transverse extension configured to act on an intermediate longitudinal member that is used to move a gearshift fork,
  wherein the intermediate longitudinal member is mounted on a tertiary shaft and is mounted in translation in relation to the casing, and
  in which the tertiary shaft is mounted slidingly through the casing and the intermediate longitudinal member is fastened to the tertiary shaft.

2. The device as claimed in claim 1, in which the gearshift fork is positioned on a secondary shaft.

3. The device as claimed in claim 1, in which the transverse extension of the main shaft is configured to cooperate with a slot in the intermediate longitudinal member.

4. The device as claimed in claim 1, in which the intermediate longitudinal member has a slot that is configured to cooperate with a projection from the gearshift fork.

5. The device as claimed in claim 4, in which the projection has a rectangular section.

6. The device as claimed in claim 1, in which the gearshift fork is positioned on a secondary shaft, and at least one of the primary, secondary, and tertiary shafts is mounted slidingly in a bearing seated in the casing.

7. The device as claimed in claim 1, further comprising a rotation prevention device configured to limit the angular displacement of the intermediate longitudinal member.

8. The device as claimed in claim 7, in which the rotation prevention device includes translational guide means for the intermediate longitudinal member.

9. The device as claimed in claim 1, in which the tertiary shaft passes through a hub of the intermediate longitudinal member.

10. The device as claimed in claim 1, in which the tertiary shaft is attached to the intermediate longitudinal member by a pin.

11. The device as claimed in claim 1, in which the primary, secondary, and tertiary shafts are each mounted slidingly in a bearing seated in the casing.

* * * * *